United States Patent [19]

Baker et al.

[11] Patent Number: 4,906,256
[45] Date of Patent: Mar. 6, 1990

[54] MEMBRANE PROCESS FOR TREATMENT OF FLUORINATED HYDROCARBON-LADEN GAS STREAMS

[75] Inventors: Richard W. Baker, Palo Alto, Calif.; Carl-Martin Bell, Stuttgart, Fed. Rep. of Germany; Johannes G. Wijmans, Menlo Park, Calif.; Bernd Ahlers, Varel, Fed. Rep. of Germany

[73] Assignee: Membrane Technology & Research, Inc., Menlo Park, Calif.

[21] Appl. No.: 327,860

[22] Filed: Mar. 23, 1989

[51] Int. Cl.$^4$ .............................................. B01D 53/22
[52] U.S. Cl. ............................................ 55/16; 55/71
[58] Field of Search ............................. 55/16, 71, 158

[56] References Cited

U.S. PATENT DOCUMENTS

| | | | |
|---|---|---|---|
| 2,159,434 | 5/1939 | Frey | 55/16 X |
| 2,388,095 | 10/1945 | Stahly | 55/16 |
| 2,617,493 | 11/1952 | Jones | 55/16 |
| 3,903,694 | 9/1975 | Aine | 55/16 X |
| 4,119,417 | 10/1978 | Heki et al. | 55/16 X |
| 4,239,507 | 12/1980 | Benoit et al. | 55/16 |
| 4,243,701 | 1/1981 | Riley et al. | 55/158 X |
| 4,264,338 | 4/1981 | Null | 55/158 X |
| 4,435,191 | 3/1984 | Graham | 55/16 |
| 4,444,571 | 4/1984 | Matson | 55/16 |
| 4,553,983 | 11/1985 | Baker | 55/16 |
| 4,597,777 | 7/1986 | Graham | 55/158 X |
| 4,701,187 | 10/1987 | Choe et al. | 55/16 |
| 4,717,407 | 1/1988 | Choe et al. | 55/158 X |

FOREIGN PATENT DOCUMENTS

| | | | |
|---|---|---|---|
| 55-097233 | 7/1980 | Japan | 55/16 |
| 60-000807 | 1/1985 | Japan | 55/158 |
| 63-218215 | 9/1988 | Japan | 55/16 |

OTHER PUBLICATIONS

D. L. Roberts and G. D. Ching, "Recovery of Freon Gases with Silicone Rubber Membranes", I&EC Process Design & Development, 1986, vol. 25, p. 971-973.
S. S. Kremen, "Technology and Engineering of Roga Spiral-Wound Reverse Osmosis Membrane Modules", Chapter 17, pp. 371-385, Reverse Osmosis and Synthetic Membranes, National Research Council Canada, NRCC No. 15627, 1977.

Primary Examiner—Robert Spitzer
Attorney, Agent, or Firm—J. Farrant

[57] ABSTRACT

A membrane process for separating fluorinated hydrocarbon vapors is disclosed. The process employs a permselective membrane that is selectively permeable to fluorinated hydrocarbons over oxygen or nitrogen. The process involves contacting the feed side of the membrane with a gas mixture containing the fluorinated hydrocarbon vapor, and withdrawing from the permeate side a vapor enriched in the fluorinated hydrocarbon component. The driving force for membrane permeation is preferably provided by maintaining a partial vacuum on the permeate of the membrane. Eighty to 99% of the fluorinated hydrocarbon contained in the feedstream can be removed by the process. The permeate may be sufficiently enriched in fluorinated hydrocarbon to permit recovery and reuse. Very high membrane selectivities are not required.

23 Claims, 11 Drawing Sheets

MEMBRANE PROCESS FOR TREATMENT OF FLUORINATED HYDROCARBON-LADEN GAS STREAMS

This invention was made in part with Government support under SBIR Contract Number 68D80029, awarded by the Environmental Protection Agency. The Government has certain rights in this invention.

FIELD OF THE INVENTION

The invention relates to a membrane system for the treatment of airstreams containing fluorinated hydrocarbons, both to recover the fluorinated hydrocarbons and to reduce air pollution.

BACKGROUND OF THE INVENTION

Fluorinated hydrocarbons are widely used in solvent degreasing, foam blowing, and the construction of refrigeration and air conditioning equipment, for example. Many industrial processes produce waste airstreams containing low concentrations of fluorinated hydrocarbons including chlorofluorocarbons (CFCs) and halons (fluorinated hydrocarbons containing one or more bromine atoms). In the manufacture of these chemicals, and in industrial plants using them, streams with relatively high concentrations of halocarbons are also encountered. Table I shows that enormous amounts of the two most common fluorine-containing halocarbon solvents, CFC-11 ($CCl_3F$) and CFC-12 ($CCl_2F_2$) are emitted into the atmosphere each year. It is estimated that only 10% of the total CFC-11 and CFC-12 produced is recycled. The remaining 90% is released into the atmosphere.

TABLE 1

Use and Worldwide Emission of Freons Regulated by the Montreal Protocol

| Chemical | Major Use | Estimated 1980 Emissions (1,000 tons) |
|---|---|---|
| CFC-11 | Rigid and flexible polyurethane foam, refrigeration, and air-conditioning | 266 |
| CFC-12 | Rigid and flexible polyurethane foam, aerosol, sterilization, refrigeration, air conditioning, and food freezing | 378 |
| CFC-113 | Degreasing and cleaning agent in electronics manufacturing industry | 80 |
| CFC-114 | Rigid nonpolyurethane foam | — |
| CFC-115 | Refrigeration, air conditioning | — |

Fluorinated hydrocarbons are expensive, making their recovery from effluent streams and their subsequent reuse very economically attractive. The current failure of producers and users to recover more than small amounts of these compounds is therefore indicative of the inadequacy of present treatment and recovery methods. It is imperative that CFCs and similar compounds be removed from effluent streams because of scientific evidence linking them to depletion of the ozone layer. The United States and many other nations have signed an agreement entitled the "Montreal Protocol on Substances that Deplete the Ozone Layer". The Montreal Protocol calls for progressive production freezes on the following chemicals: CFC-11 ($CCl_3F$), CFC-12 ($CCl_2F_2$), CFC-113 $C_2Cl_3F_3$), CFC-114 ($C_2Cl_2F_4$), CFC-115 ($C_2ClF_5$), Halon-1211 ($CF_2ClBr$), Halon-1301 ($CF_3Br$) and Halon-2402 ($C_2F_4Br_2$). It is planned to reduce the production of CFCs to 50% of the 1986 levels in the next decade and to limit the production of halons to the 1986 levels. However, conventional CFCs will probably continue to be manufactured until the year 2000. An efficient method of reducing emissions of these environmentally harmful solvents is urgently needed. Even when the present levels of emissions are reduced, and/or alternative, environmentally safer substitutes, such as the HCFCs, are found, there will be a continuing need for recovery systems both from an economic and a pollution point of view.

Conventional systems for treating airstreams contaminated with organic solvent vapors involve incineration, carbon adsorption and compression condensation. Fluorinated hydrocarbons are difficult to treat by condensation processes because of their volatility. They are generally not appropriate for treatment by incineration because they are non-flammable. Carbon adsorption can only be used efficiently for very dilute streams, because the operating and capital costs of the plants increase with increasing solvent concentration in the feed. Also, high concentration leads to unacceptably high temperatures in the carbon bed because of the exothermic adsorption step. Consequently process streams must frequently be diluted many-fold before being passed to the carbon beds. Regeneration of the beds makes labor and maintenance requirements onerous and expensive. In addition, some fluorinated solvents are not stable during the steam regeneration cycle, leading to corrosion of the system, and some low boiling compounds are not adequately adsorbed. Compression condensation is only suitable for highly concentrated streams and for solvent streams than can be brought to their dew point without the need for excessive cooling and/or the application of very high pressures. A number of fluorinated hydrocarbons have very low boiling points and are unsuitable for treatment by compression condensation. Efficient economic separation processes, capable of handling streams in the range from those containing a few ppms of fluorinated hydrocarbons to those where the fluorinated hydrocarbon forms the major component of the stream, would therefore represent a major advance in the field.

That membranes have the potential to separate organic vapors from air is known in the art. For example, U.S. Pat. No. 4,553,983, commonly owned with the present invention, describes a process for separating airstreams containing low concentrations of organic vapor (2% or less) from air, using highly organicselective membranes. U.S. Pat. No. 3,903,694 to Aine describes a concentration driven membrane process for recycling unburnt hydrocarbons in an engine exhaust. U.S. Pat. No. 2,617,493 to Jones describes separation of nitrogen from concentrated hydrocarbon feedstreams.

The permeability of a gas or vapor through a membrane is a product of the diffusion coefficient, D, and the Henry's law sorption coefficient, k. D is a measure of the permeant's mobility in the polymer; k is a measure of the permeant's sorption into the polymer, and depends in part on the condensability of the vapor. The diffusion coefficient tends to decrease as the molecular size of the permeate increases, because large molecules interact with more segments of the polymer chains and are thus less mobile. On this basis alone, one would expect that organic vapors, which in general are large molecules compared with oxygen and nitrogen, would have much lower permeabilities than air through most polymers. With rigid, glassy polymer materials this is generally true. In elastomeric membrane materials however, the effect of the sorption coefficient can be dominant. Particularly for easily condensable, reactive organic compounds, the sorption coefficient in a rubbery material may be so high that the material exhibits a high or very high organic permeability. The ideal selectivity, defined as the ratio of the permeabilities measured with pure gas or vapor streams, for the organic over air may then also be very high. For example, organic/nitrogen ideal selectivities up to 1,000 or more have been measured in some rubbery polymers for acetone, trichloroethane, toluene and octane. Of course, it is recognized that the actual selectivity obtained in a real process may be substantially lower than the ideal selectivity, because the organic concentration in the mixture is low, or because the organic component swells the membrane, thereby increasing the permeation of nitrogen and oxygen. Fluorinated hydrocarbons as a class are relatively inert, and exhibit high volatility and hence poor condensability. Thus, from their general properties it might be predicted that the selectivities of rubbery polymers for fluorinated hydrocarbons would be relatively modest, compared with the figures above. In fact, this prediction is borne out experimentally. A product bulletin from General Electric gives the ideal selectivities of CFCs 11, 12, 22, 114 and 115 over air as between 50 and 2. A paper by Roberts and Ching, of SRI, entitled "Recovery of Freon Gases with Silicone Rubber Membranes" discusses the permeabilities of certain fluorinated hydrocarbons through silicone rubber, and reports many results where the fluorinated hydrocarbon was less permeable than air. Thus, theoretical predictions, coupled with the available teachings in the art, would suggest that fluorinated hydrocarbons are relatively poorly separated from air by membranes, compared with other organic vapors, and are not good candidates for treatment by means of a membrane-based system. To applicants' knowledge, membrane processes that can treat fluorinated hydrocarbon-contaminated streams, leaving a residue stream form which the majority of the hydrocarbon has been removed, and/or producing a permeate from which the hydrocarbon can be recovered for reuse, have not previously been available to the art.

SUMMARY OF THE INVENTION

The invention is a membrane process for removal and recovery of fluorinated hydrocarbons from airstreams. These airstreams may be effluent streams that would conventionally be discharged untreated, or would be subject to some other treatment method or methods. Alternatively they may be internal process streams from which it is desirable, for example, to recycle the fluorinated hydrocarbon component for reuse. The process of the invention involves running the feedstream containing the fluorinated hydro carbon across a membrane that is selectively permeable to the fluorinated hydrocarbon component. The fluorinated hydrocarbon is therefore concentrated in the stream permeating the membrane; the residue non-permeating stream is depleted in fluorinated hydrocarbon content. The driving force for permeation across the membrane is the pressure difference on the feed and permeate sides. The efficiency of the process, in terms of the relative proportions of fluorinated hydrocarbon, oxygen and nitrogen in the feed, permeate and residue streams, will be determined by a number of factors, including the pressure difference, the selectivity of the membrane, the proportion of the feed that permeates the membrane, and the membrane thickness. The present invention teaches processes applicable to feedstreams ranging in concentration from relatively dilute to concentrated, and recognizes that effective membrane separation is possible, even when the membrane selectivity is modest. Preferably the process produces a permeate stream from which the fluorinated hydrocarbon can be recovered as a liquid by cooling and/or compressing the permeate stream. The process is particularly useful when the raw stream is unsuitable, either because of the intrinsic properties of the fluorinated hydrocarbon involved, or because of the concentration range, for treatment by carbon adsorption or compression condensation. The process can be applied to fluorinated hydrocarbon contaminated streams that are difficult or impossible to treat with non-membrane based technologies. Eighty to 99% or above removal of the fluorinated hydrocarbon content of the feed can typically be achieved with one-step or two-step membrane systems, leaving a residue stream containing only traces of organic. The permeate stream is typically concentrated 5 to 100-fold compared with the feedstream. The processes of the invention would therefore have a major environmental impact, in that fluorinated hydrocarbon pollution could be drastically reduced in many cases, and completely eliminated in some. Economic calculations show that the process is substantially cheaper than conventional technologies for many feedstreams, with a payback time in some instances of as little as a few months. Thus, industries producing fluorinated- hydrocarbon-laden effluent streams have a powerful economic as well as ecological motivation to reduce their emissions.

It is an object of the invention to provide a process for efficiently removing fluorinated hydrocarbons from airstreams.

It is an object of the invention to provide a process for efficiently recovering fluorinated hydrocarbons from airstreams.

It is an object of the invention to provide processes that can be tailored to treat airstreams containing fluorinated hydrocarbons in concentrations ranging from 100 ppm or less to greater than 50%.

It is an object of the invention to provide a process that can treat airstreams containing fluorinated hydrocarbons directly at their source point.

It is an object of the invention to provide a process that can treat airstreams containing fluorinated hydrocarbons without the need for predilution of the feedstream.

It is an object of the invention to reduce fluorinated hydrocarbon emissions to the atmosphere.

It is an object of the invention to provide a motivation for industries discharging fluorinated hydrocarbons to reduce or eliminate their emissions.

Other objects and advantages of the invention will be apparent from the description of the invention to those of ordinary skill in the art.

To achieve the foregoing objects, the invention provides a membrane-based process for treatment of fluorinated hydrocarbon streams. The process involves running the stream across the feed side of a thin permselective membrane. The membrane is selectively permeable to the organic component of the feedstream, so that the fluorinated hydrocarbon component is enriched in the permeate compared with the feed. The permselective membrane materials used in the invention ar preferably rubbery polymers at the operating conditions of the system, that is they have glass transition temperatures below the temperature of the feed gas.

To achieve a high flux of the permeating components, the permselective membrane should be made as thin as possible. A preferred embodiment of the invention involves the use of a composite membrane comprising a microporous support, onto which the rubbery permselective layer is deposited as an ultrathin coating. The preparation of such membranes is known in the art, and is discussed in detail below.

The membrane configuration is not critical to the invention. In a preferred embodiment, the membranes are cast and coated as flat sheets, and then rolled into spiral-would modules. However, other types of configuration, such as hollow fibers, plate-and-frame, or flat sheet membranes are also possible and are intended to be within the scope of the invention.

The flux of a gas or vapor through a polymer membrane is proportional to the pressure difference of that gas or vapor across the membrane. To achieve high fluxes of the permeating components, it is desirable not only to make the permselective membrane very thin, but also to operate the system with a substantial pressure drop across the membrane. The pressure drop is preferably achieved by drawing a partial vacuum on the permeate side of the membrane. Preferably, the permeate stream may be cooled and compressed for form a pure liquid solvent stream. The residue stream may be clean enough for direct discharge, may be suitable for recycling within the process, or may be passed to a secondary treatment if necessary.

It is to be understood that the above summary and the following detailed description are intended to explain and illustrate the invention without restricting its scope.

DETAILED DESCRIPTION OF THE INVENTION

Figure 1:
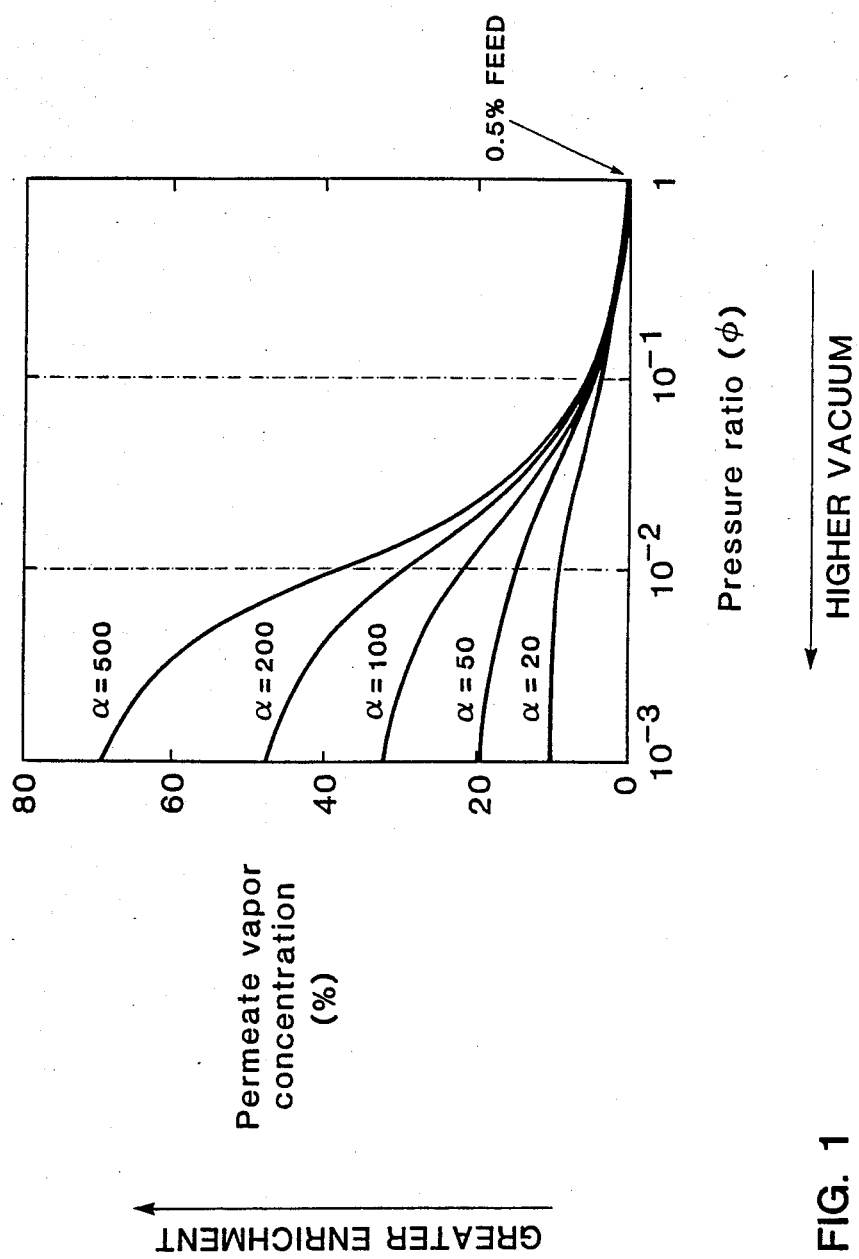
FIG. 1 is a graph showing the relationship between permeate vapor concentration and pressure ratio for membranes of varying selectivities.

The term vapor as used herein refers to organic solvents in the gaseous phase below their critical temperatures.

The term fluorinated hydrocarbon as used herein refers to fully or partially substituted hydrocarbons wherein at least one fluorine atom is substituted for a hydrogen atom and at least one halogen atom is substituted for a second hydrogen atom.

The term CFC as used herein refers to fluorinated hydrocarbons containing at least one fluorine atom and one chlorine atom.

The term HCFC as used herein refers to fluorinated hydrocarbons containing at least one fluorine atom, one chlorine atom and one hydrogen atom.

The term permselective as used herein refers to polymers, or membranes made from those polymers, that exhibit selective permeation for at least one gas or vapor in a mixture over the other components of the mixture, enabling a measure of separation between the components to be achieved.

The term multilayer as used herein means comprising a support membrane and one or more coating layers.

The feedstreams that can be treated by the process of the present invention may arise from a variety of sources. The main uses of fluorinated hydrocarbons are as foam-forming agent in plastics processing and as the working fluid in refrigerators and air conditioners. Table 2 shows that, in the U.S., approximately one-third of the fluorinated hydrocarbons produced are used in foam-forming applications and one-third are used in air conditioning and refrigeration applications.

TABLE 2

| U.S. Consumption of Fluorinated Hydrocarbons by Major Industrial Users (1985)* | | | |
|---|---|---|---|
| Industry | Use (1,000 tons) | Percentage Total Use | Compound |
| Flexible foam | 18.6 | 6 | CFC-11 |
| Rigid polyurethane foam | 61.3 | 22 | CFC-11, CFC-12 |
| Rigid nonurethane foam | 12.8 | 5 | CFC-12, CFC-114 |
| Refrigeration and air conditioning | 96 | 35 | CFC-11, 12, 114, 115 |
| Aerosol | 11.6 | 4 | CFC-11, 12 |
| Electronics | 54.8 | 20 | CFC-113 |

TABLE 2-continued

U.S. Consumption of Fluorinated Hydrocarbons by Major Industrial Users (1985)*

| Industry | Use (1,000 tons) | Percentage Total Use | Compound |
| --- | --- | --- | --- |
| manufacturing | | | |
| Fire extinguishers | 43.4 | — | Halon 1211, 1301, 2402 |
| Miscellaneous | 22 | 8 | CFC-12 |

*Federal Register 52(239), 1987

Table 3 shows commonly used fluorinated hydrocarbons and other halogenated solvents, the typical applications in which they are used, and the typical effluent stream concentrations. It should be noted that the solvent concentration in many of these streams is low. This is a result of the industry-wide practice of pooling all airstreams and simply venting. Even minor changes in system design to segregate concentrated sources would produce a number of much more concentrated streams.

TABLE 3

Halogenated and Fluorinated Hydrocarbon Industrial Stream Data and Concentrations

| Application | Hydrocarbon | Stream concentration | |
| --- | --- | --- | --- |
| Flexible foam industry | CFC-11 | 50–600 | ppm |
| exhaust streams | CFC-11 | 500–2000 | ppm |
| | Methylene chloride | 100–2000 | ppm |
| Rigid foam industry | CFC-12 | 50–1000 | ppm |
| exhaust streams | HCFCs | 100–1000 | ppm |
| Metal degreasing exhaust | CFC-113 | 2000 | ppm |
| Metal degreasing streams | CFC-113 | 0.5–5% | |
| CFC production streams | All CFCs | 0.5–50% | |
| CFC production | CFC 114 | 6% | |
| Distillation vent streams | CFC-113 | 40% | |
| Solvent manufacturer's | 1,1,2-Trichloroethane | 100 | ppm |
| exhaust | Trichloroethylene | 100 | ppm |
| CFC-contaminated | 1,1,2-Trichloroethane | 200 | ppm |
| streams from air | Trichloroethylene | 200 | ppm |
| strippers | CFC-113 | 200 | ppm |
| Fire extinguishing | Halon 1211 | 0.1–5% | |
| | Halon 1301 | 0.1–5% | |

The scope of the invention is not intended to be limited to any particular streams, but to encompass any situation where a stream containing fluorinated hydrocarbons is to be separated. The composition of the gas may vary widely, from a mixture that contains 100 ppm organic or less, to streams that contain the organic as the major component. Representative fluorinated hydrocarbons that may be separated from the feedstream by the process of the invention include, but are not limited to, CFC-11 ($CCl_3F$), CFC-12 ($CCl_2F_2$), CFC-113 ($C_2Cl_3F_3$), CFC-114 ($C_2Cl_2F_4$), CFC-115 ($C_2ClF_5$), HCFC-21 ($CHCl_2F$), HCFC-22 ($CHClF_2$), HCFC-23 ($CHF_3$), HCFC-123 ($C_2HCl_2F_3$), HCFC-142b ($C_2H_3ClF_2$), Halon-1211 ($CF_2ClBr$), Halon-1301 ($CF_3Br$) and Halon-2402 ($C_2F_4Br_2$).

In the process of the present invention, a feedstream containing a fluorinated hydrocarbon is passed across a thin, permselective membrane. The permselective membrane forms a barrier that is relatively permeable to the fluorocarbon component of the stream, but relatively impermeable to oxygen and nitrogen. The membrane may take the form of a homogeneous membrane, a membrane incorporating a gel or liquid layer, or any other form known in the art. Preferred embodiments of the invention employ a multilayer membrane comprising a microporous support onto which is coated an ultrathin permselective layer of a rubbery polymer. The microporous support membrane should have a flow resistance that is very small compared to the permselective layer. A preferred support membrane is an asymmetric Loeb-Sourirajan type membrane, which consists of a relatively open, porous substrate with a thin, dense, finely porous skin layer. Preferably the pores in the skin layer should be less than 1 micron in diameter, to enable it to be coated with a defect-free permselective layer. The support membrane should resist the solvents used in applying the permselective layer. If the polymer material used for the permselective layer is soluble only in aggressive solvents, such as toluen, methylene chloride, or tetrahydrofuran, a solvent resistant support material, such as polyimide or polysulfone, is desirable. Asymmetric polysulfone and polyimide membranes are available commercially for ultrafiltration applications, for example as NTU ® 4220 (crosslinked polyimide), or NTU ® 3050 (polysulfone) from Nitto Electric Industrial Company, Osaka, Japan. Either support may be used with a silicone rubber permselective layer; for other rubbery materials polyimide supports may be better. Other suitable support membranes may be made by the processes for making finely microporous or asymmetric membranes known in the art. Polymers which may be used in addition to polysulfone or polyimide include polyvinylidene fluoride (Kynar ®461, Pennwalt Corp., Philadelphia, Pennsylvania), or aromatic polyamides (Nomex ®450, DuPont, Wilmington, Delaware). Simple isotropic supports, such as microporous polypropylene or polytetrafluorethylene can also be used. The thickness of the support membrane is not critical, since its permeability is high compared to that of the permselective layer. However the thickness would normally be in the range 100 to 300 microns, with about 150 microns being the preferred value.

Optionally, the support membrane may be reinforced by casting it on a fabric web. The multilayer membrane then comprises the web, the microporous membrane, and the ultrathin permselective membrane. The web material may be, for example, a polyester such as Hollytex, available from Eaton-Dikeman, Mt. Holly Springs, Pennsylvania. The permselective layer could not be cast directly on the fabric web, because it would penetrate the web material, rather than forming an unbroken surface coating.

To separate the fluorinated hydrocarbon from the feedstream requires a permselective layer that is selectively permeable to the fluorinated hydrocarbon. The mathematical model used to predict permeation behavior is the solution-diffusion model. In simple systems, where the rate-limiting step is diffusion through the membrane, Fick's Law of diffusion leads to the equation $$J = \frac{Dk\Delta p}{l}, \qquad (1)$$

where J is the membrane flux ($cm^3$(STP)/$cm^2 \cdot s \cdot cmHg$), D is the diffusion coefficient of the gas or vapor in the membrane ($cm^2$/sec) and is a measure of the gas mobility, l is the membrane thickness, k is the Henry's law sorption coefficient linking the concentration of the gas or vapor in the membrane material to the pressure in the adjacent gas ($cm^3$(STP)/$cm^3 \cdot cmHg$), and $\Delta p$ is the pressure difference across the membrane. The product Dk can also be expressed as the permeability, P, a measure of the rate at which a particular gas or vapor moves through a membrane of standard thickness (1 cm) under a standard pressure difference (1 cmHg).

A measure of the ability of a membrane to separate two components, (1) and (2), of a feedstream is the ratio of their permeabilities, α, called the membrane selectivity, $$\alpha_{2/1} = \frac{P_{(2)}}{P_{(1)}} \qquad (2)$$

Some membrane materials, particularly rubbery polymers, possess an intrinsically high selectivity for organic solvents over air and can therefore be used in a membrane separation process. Preferred permselective membranes used in the invention therefore are rubbery non-crystalline polymers, that is they have a glass transition temperature below the normal operating temperature of the system. Thermoplastic elastomers are also useful. These polymers combine hard and soft segments or domains in the polymer structure. Provided the soft segments are rubbery at the temperature and operating conditions of the invention, polymers of this type could make suitable membranes for use in the invention. Polymers that may be used include, but are not limited to, nitrile rubber, neoprene, polydimethylsiloxane (silicone rubber), chlorosulfonated polyethylene, polysilicone-carbonate copolymers, fluoroelastomer, plasticized polyvinylchloride, polyurethane, cis-polybutadiene, cis-polyisoprene, poly(butene-1), polystyrene-butadiene copolymers, styrene/butadiene/styrene block copolymers, styrene/ethylene/butylene block copolymers, thermoplastic polyolefin elastomers, and block copolymers of polyethers and polyesters. To maximize the flux of permeating components, the permselective layer should be made as thin as possible. However, the permselective layer must also be free of pinholes or other defects that could destroy the selectivity of the membrane by permitting bulk flow-through of gases. In the context of the invention, a particularly preferred rubber is silicone rubber. Silicone rubber solutions can wet a finely microporous support and leave a uniform, defect-free coating after solvent evaporation, so the preferred membrane is one in which the permselective coating is deposited directly on the microporous support. However optional embodiments that include additional sealing or protective layers above or below the permselective layer are also intended to be encompassed by the invention.

The preferred method of depositing the permselective layer is by dip coating. In order to use this method, the polymer material that forms the permselective layer should be a film-forming material that is soluble in standard organic solvents. The dip coating method is described, for example, in U.S. Pat. No. 4,243,701 to Riley et al., incorporated herein by reference. For example, a support membrane from a feed roll is passed through a coating station, then to a drying oven, and is then wound onto a product roll. The coating station may be a tank containing a dilute polymer or prepolymer solution, in which a coating typically 50 to 100 microns thick is deposited on the support. Assuming a 1% concentration of polymer in the solution, after evaporation a film 0.5 to 1 micron thick is left on the support.

Alternatively, the permselective membrane may be cast by spreading a thin film of the polymer solution on the surface of a water bath. After evaporation of the solvent, the permselective layer may be picked up onto the microporous support. This method is more difficult in practice, but may be useful if the desired support is attacked by the solvent used to dissolve the permselective material.

The thickness of the permselective layer should normally be in the range 0.1 to 20 microns, preferably 5 microns or less, and more preferably 0.1 to 2 microns.

The permselective membranes used in the present invention should preferably have a selectivity for the fluorinated hydrocarbon over air of at least 5, and more preferably at least 10, and most preferably at least 20. However, contrary to some previous teachings in the art, extremely high selectivities are not necessary desirable or advantageous, as the examples and accompanying discussion show. Besides the selectivity, other factors determine the degree of enrichment of organic solvent obtained in a membrane process. The first is the extent of removal of organic vapor from the feed. When a given volume of the feedstream enters the membrane, it immediately begins to lose organic vapor, as the organic vapor preferentially permeates the membrane. Thus, the concentration of organic vapor in the feedstream decreases as it passes through the membrane module. The average concentration of the organic vapor on the feed side of the membrane will determine the average concentration of vapor on the permeate side of the membrane. If concentration of organic in the feed is reduced to a small value before it leaves the module, the average feed stream concentration will be low. As a result, the solvent enrichment in the permeate stream is low also. Thus, as organic removal from the feedstream is increased, the average concentration of organic vapor in the permeate decreases.

A second factor affecting the performance of a membrane system is the pressure of feed and permeate gas streams. The driving force for permeation is the difference between the partial pressures of the components on the feed and permeate sides. However, in addition, the ratio of the feed to the permeate pressures defined as $$\phi = \frac{\text{total permeate pressure } (p'')}{\text{total feed pressure } (p')} \qquad (3)$$

is important. The partial pressure of the organic vapor on the permeate side of the membrane must never exceed the partial pressure on the feed side, or the permeation process would stop. Thus, even for an infinitely selective membrane, the concentration of organic vapor on the permeate side of the membrane can never be greater than $1/\phi$ times the concentration in the feed.

The relationship between pressure ratio and selectivity can be derived from the Fick's law expression for the membrane fluxes, $J_1$ and $J_2$, given as $$J_1 = \frac{P_1(p_1' - p_1'')}{l}, \qquad (4)$$

and $$J_2 = \frac{P_2(p_2' - p_2'')}{l}, \qquad (5)$$

where $P_1$ and $P_2$ are the permeabilities of components 1 and 2, $l$ is the membrane thickness, and $p_1'$, $p_2'$ and $p_1''$, $p_2''$, are the partial pressures of the two gases or vapors in the feed and permeate streams, respectively. The total gas pressure is equal to the sum of the partial pressures, i.e., $$p' = p_1' + p_2' \quad (a)$$
$$p'' = p_1'' = p_2'' \quad (b) \tag{6}$$

The volume fractions, $C_1'$ and $C_2'$ of the two components in the feed, and in the permeate, $C_1''$ and $C_2''$ are given by:

$$C_1' = \frac{p_1'}{p'}, \quad C_1'' = \frac{p_1''}{p''}, \quad (c) \tag{7}$$

$$C_2' = \frac{p_2'}{p'}, \quad C_2'' = \frac{p_2''}{p''}, \quad (d)$$

Combining equations (3-7) then yields the expression $$C_2'' = \frac{1}{2} \cdot \frac{1}{\phi} \left( C_2' + \phi + \frac{1}{\alpha - 1} - \sqrt{\left(C_2' + \phi + \frac{1}{\alpha-1}\right)^2 - \frac{4\phi C_2'\alpha}{\alpha - 1}} \right), \tag{8}$$

At low pressure ratios, i.e., relatively modest permeate vacuums, when $\alpha_{2/1} \gg 1/\phi$, the permeate concentration, $C_2''$, is proportional to the pressure ratio across the membrane and is essentially independent of the membrane's selectivity, $\alpha_{2/1}$. This is the pressure controlled region. At high pressure ratios, i.e., relatively low permeate vacuums, when $\alpha_{2/1} \ll 1/\phi$, the permeate concentration is proportional to the membrane selectivity and is essentially independent of the pressure ratio across the membrane. This is the membrane selectivity controlled region. There is, of course, an intermediate region between these two limiting cases when both the pressure ratio and the membrane selectivity affect the membrane system performance. These three regions are illustrated in FIG. 1, which plots the calculated permeate organic vapor concentration, $C_2''$, against pressure ratio, $\phi$, for membranes of selectivities 20, 50, 100, 200 and 500.

The pressure ratio across the membrane can be achieved by pressurizing the feed, by evacuating the permeate or by both. Because the volume of the permeate stream is much less than the volume of the feed, it is energy and cost effective, and therefore preferable in the context of the invention, to operate in the vacuum mode, i.e., drawing a partial vacuum on the permeate side. At pressure differences between 0.01 and 0.001, very large differences in performance with differing selectivity can be achieved. However, to achieve such pressure ratios involves drawing a hard vacuum on the permeate side. The feedstream is only slightly pressurized to force the feed gas through the membrane module, preferably not more than to about 5 atm pressure, more preferably to not more than 2 atm pressure, and most preferably to only a few psig over atmospheric pressure. Therefore, a pressure ratio of 0.1 is roughly equivalent to a permeate pressure of 8 cmHg, a pressure ratio of 0.01 to a permeate pressure of 0.8 cmHg, and a pressure ratio of 0.001 to a permeate pressure of 0.08 cmHg. Pressures less than 1 cmHg can be achieved in a laboratory-scale experiment, but will be difficult and very expensive to realize a full-scale industrial process. Therefore, a value of 0.01 is probably the preferably lower limit for practical pressure ratios in an industrial setting. FIG. 1 shows that for pressure ratios ranging from 0.1 to 1, the separation achieved is modest and is largely independent of the membrane selectivity, i.e., the separation is pressure ratio controlled. The preferred operating zone for the processes of the invention, therefore, is generally in the middle region of FIG. 1, where a good separation can be achieved by combining a membrane with a good, but not excessively high, selectivity, typically in the range 5-200, with a pressure ratio in an economically sustainable range, such as 0.01-0.1. This limits the maximum enrichment of organic vapor obtained in a single-stage industrial system to this range.

The form in which the membranes are used in the invention is not critical. They may be used, for example, as flat sheets or discs, coated hollow fibers, or spiral-would modules, all forms that are known in the art. Spiral-wound modules are a preferred choice. References that teach the preparation of spiral-wound modules are S. S. Kremen, "Technology and Engineering of ROGA Spiral Wound Reverse Osmosis Membrane Modules", in *Reverse Osmosis and Synthetic Membranes,* S. Sourirajan (Ed.), National Research Council of Canada, Ottawa, 1977; and U.S. Pat. No. 4,553,983, column 10, lines 40-60. Alternatively the membranes may be configured as microporous hollow fibers coated with the permselective polymer material and then potted into a module.

One reason why the processes encompassed by the invention are useful is that they can reduce the organic content of the residue stream to an acceptable level for discharge or secondary treatment. Another reason is that they can produce a permeate stream sufficiently concentrated that the fluorinated hydrocarbon content can be recovered for reuse. A simple, and therefore preferably, way to retrieve the fluorinated hydrocarbon from the permeate stream is to include a condenser on the permeate side of the system. Many feedstreams to be treated by the process of the invention will be saturated with water vapor, or at least will have a high relative humidity. Water vapor will permeate the membrane more readily than oxygen or nitrogen. It is desirable for this reason not to chill the permeate stream below 0° C., because this may cause ice to form on the permeate side. The processes of the invention should therefore preferably be carried out so as to produce a final permeate than can be condensed to produce a liquid organic fraction at temperatures above 0° C. Condensation can be induced by compressing the permeate, but energy requirement and costs will go up accordingly. Most preferably, then, the system should be configured so that it can produce a permeate sufficiently concentrated that the fluorinated hydrocarbon vapor pressure in the permeate is greater than the saturated vapor pressure at 0° C. In this way it will be possible to recover the bulk of the permeating organic without the need for excessive compression.

Figure 2:
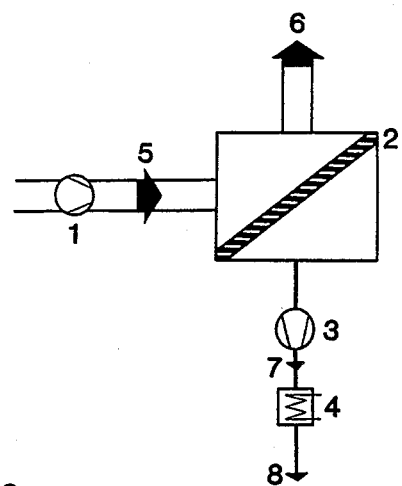
FIG. 2 is a schematic diagram of a single stage membrane system for treating a fluorinated hydrocarbon laden stream.
Figure 3:
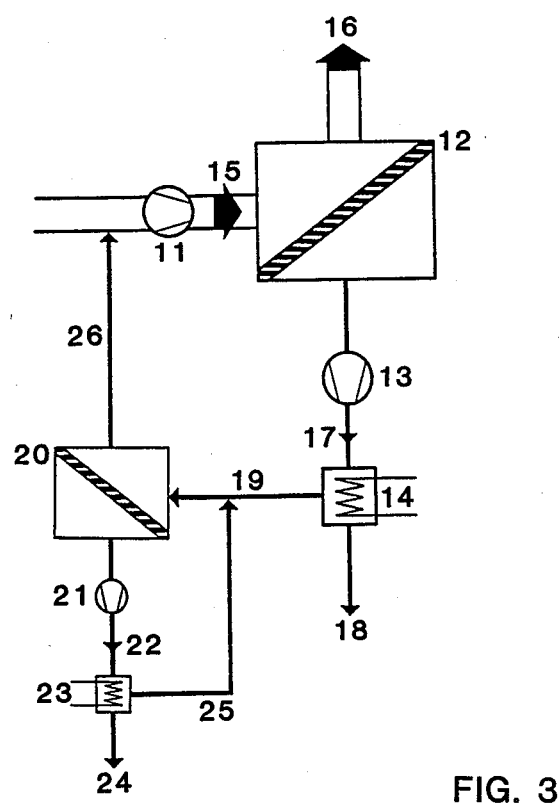
FIG. 3 is a schematic diagram of a two-stage membrane system for treating a fluorinated hydrocarbon laden stream.
Figure 4:
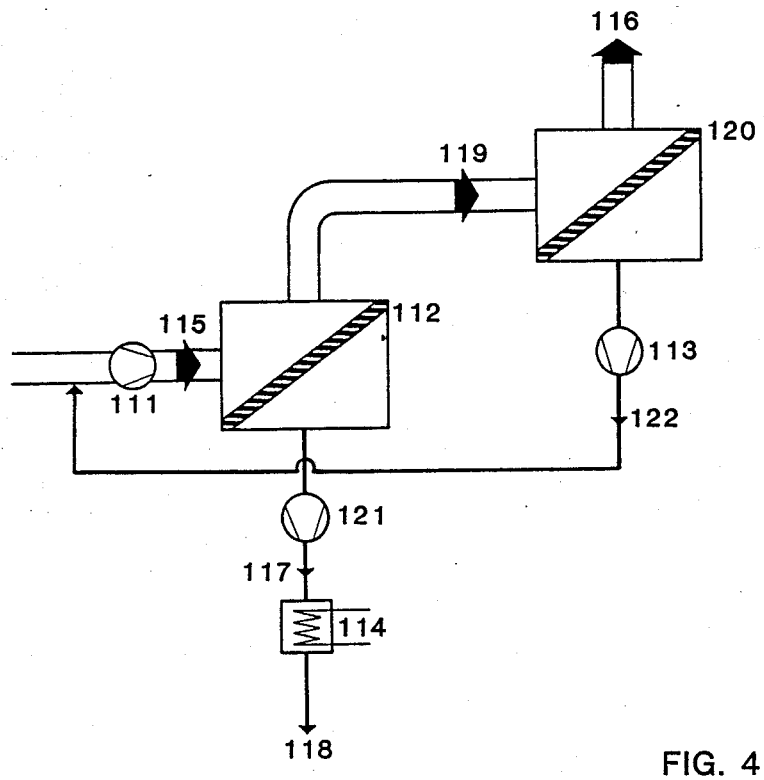
FIG. 4 is a schematic diagram of a two-step membrane system for treating a fluorinated hydrocarbon laden stream.

The process of the invention can be carried out using system designs tailored to particular requirements in terms of percentage of fluorinated hydrocarbon removed from the feed, or degree of concentration of the permeate. The simplest system is a single-stage unit shown schematically in FIG. 2. Referring now to this FIGURE, the system comprises a feed air compressor, 1, membrane unit containing one or more membrane modules, 2, permeate vacuum pump, 3, and permeate condenser, 4. In this unit, the feed airstream, 5, is compressed to 1-2 atm pressure and passed through the membrane module. The treated airstream, 6, is discharged to the atmosphere or recycled to the process. The permeate vapor, 7, enriched in the fluorinated hydrocarbon, is passed to the condenser. The condensed solvent, 8, may be transferred to a solvent holding tank. A single-stage vapor separation system such as this is generally able to remove 80-90% of the solvent from the feed air and produce a permeate that has five to ten times the concentration of the feed gas. This degree of separation is adequate for many applications. In many applications, although 80-90% removal of the solvent from the feed air is adequate, further concentration of the solvent is required to make efficient condensation of solvent form the permeate possible. This may be the case, for example, if the initial feedstream is relatively dilute. A two-stage vapor separation unit, as shown in FIG. 3, may then be used. Referring now to FIG. 3, the feed airstream, 15, passes through a compressor, 11, and thence to a first stage membrane unit, 12. The treated airstream, 16, is discharged to the atmosphere or recycled to the process. A vacuum pump, 13, is used on the permeate side of the membrane unit, and the permeating vapor stream, 17, is condensed to a liquid solvent stream, 18, by condenser, 14. The non-condensed vapor and gas stream, 19, becomes the feed for a second membrane unit, 20. The permeate from this unit, 22 passes to vacuum pump, 21, and condenser, 23, to form a liquid solvent stream, 24, and a non-condensed stream, 25, that can be recycled to the feed side of the membrane. The residue stream, 26, from the second membrane unit is combined with the feed airstream, 11. This configuration allows solvent enrichments of 50- to 100-fold to be achieved. Because the feedstream to the second stage is very much smaller than the feed to the first, the second stage is normally only 10-20% as large as the first stage. A third system design may be used when more than 90% removal of solvent from the feedstream is required. A two-step process, in which the residue from the first step is subjected to further treatment is then employed. Solvent removals of 95-99% are easily achieved. However, the second step required to reduce the feed concentration from 10% to 1% of the initial value is as large as the first step required to reduce the feed concentration from 100% to 10% of the initial value. This type of system is, therefore, more costly than the single stage or two stage designs. However, with high-value solvents such as CFCs it is still economically viable. FIG. 4 shows such a system. Referring now to this FIGURE, the feed airstream, 115, passes through a compressor, 111, and thence to a first step membrane unit, 112. The residue airstream, 119, is fed to the second step membrane unit, 120. The treated airstream, 116, is discharged to the atmosphere or recycled to the process. Vacuum pump, 121, is used on the permeate side of the first step membrane unit, and the permeating vapor stream, 117, is condensed to a liquid solvent stream, 118, by condenser, 114. The permeate stream, 122, from the second step membrane unit is recycled via vacuum pump, 113, to be combined with the incoming feedstream.

The invention is now further illustrated by the following examples, which are intended to be illustrative of the invention, but are not intended to limit the scope or underlying principles of the invention in any way.

EXAMPLES

Examples 1-10. Experimental results

Experimental procedure

All sample feedstreams were evaluated in a laboratory test system containing one membrane module with a permselective silicone rubber membrane and membrane area of approximately 2,000 cm$^2$. The air in the feed cycle was replaced with nitrogen from a pressure cylinder prior to the experiment. Nitrogen was continuously fed into the system during the experiment to replace the lost nitrogen into the permeate. Solvent vapor was continuously fed into the system by either pumping liquid solvent into the residue line using a syringe pump and evaporating the solvent using additional heating, or sending a bypass stream of the residue through a wash bottle containing the liquid solvent. The feed and residue organic concentrations were determined by withdrawing samples from the appropriate lines by syringe and then subjecting these to gas chromatograph (GC) analysis. A small bypass stream was used to take the samples at atmospheric pressure instead of the elevated pressure in the lines. Two liquid nitrogen traps were used to condense the solvent contained n the permeate stream. For long-term experiments, a non-lubricated rotary-vane vacuum pump was used on the permeate side of the module. The samples from the permeate stream were taken using a detachable glass vessel constantly purged with a bypass stream of the permeate. Upon sampling, the vessel was detached and air was allowed to enter the vessel. The concentration in the vessel was determined by gas chromatography. The permeate concentration was then calculated from the relationship:

$$\text{permeate conc.} = \text{conc. in vessel} \times \left( \frac{76 \text{ cmHg}}{\text{permeate pressure (cmHg)}} \right)$$

The procedure for a test with the system was as follows:

1. The system was run without solvent under maximum permeate vacuum to replace the air in the loop with nitrogen.
2. The nitrogen permeate flow rate was determined by measuring the vacuum pump exhaust flow rate. This provided a quality check on the module.
3. The feed flow, feed pressure and permeate pressure were adjusted to the desired values. The cold trap was filled with liquid nitrogen.
4. The solvent input was started and the feed concentration was monitored with frequent injections into the GC. The permeate pressure was adjusted if necessary.
5. The system was run until the feed analysis showed that steady state had been reached.
6. All parameters were recorded and a permeate sample was taken and analyzed.
7. Step 6 was repeated after 10-20 minutes. The feed concentration was monitored after each parameter change to ensure steady state had been reached.

EXAMPLE 1.

CFC-11. Low concentrations.

Figure 5:
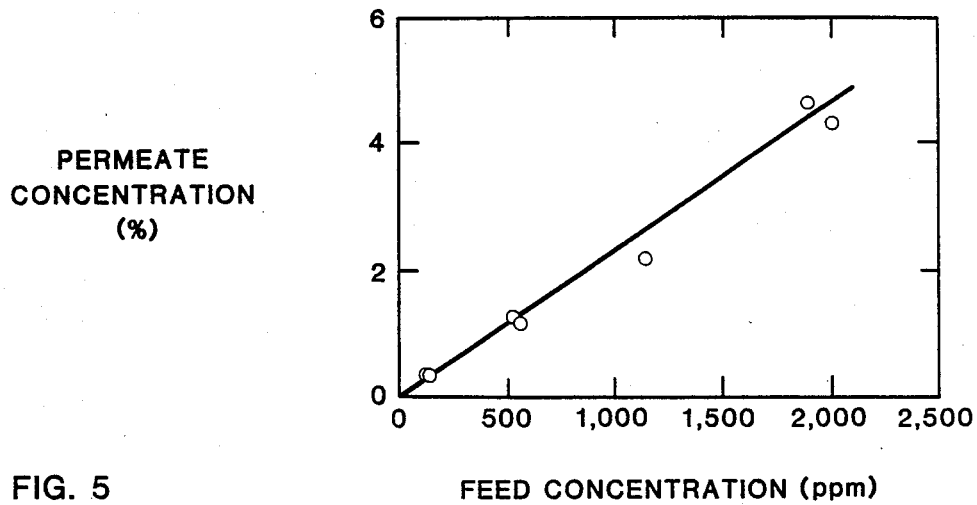
FIG. 5 is a graph showing the relationship between feed and permeate concentrations of CFC-11 at low CFC feed concentrations.
Figure 6:
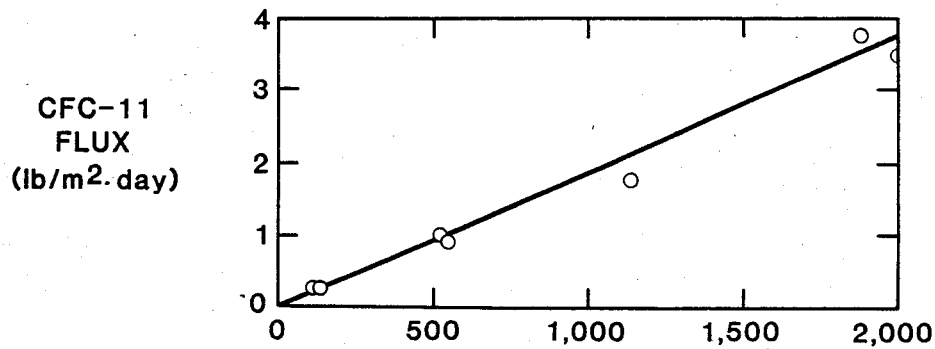
FIG. 6 is a graph showing the relationship between CFC-11 flux and feed concentration at low CFC feed concentrations.

The experimental procedures described were carried out using a feedstream containing CFC-11 (CCl$_3$F) in concentrations from 100–2,000 ppm. The results are summarized in FIGS. 5 and 6. The calculated CFC/$N_2$ selectivity of the module increased slightly from 22 at 100 ppm to 28 at 2,000 ppm. As can be seen from FIG. 6, up to about 4 lb/$m^2$·day of CFC-11 could be recovered, even from a very dilute stream in a very simple one-step process.

EXAMPLE 2.

CFC-11. Higher concentrations.

Figure 7:
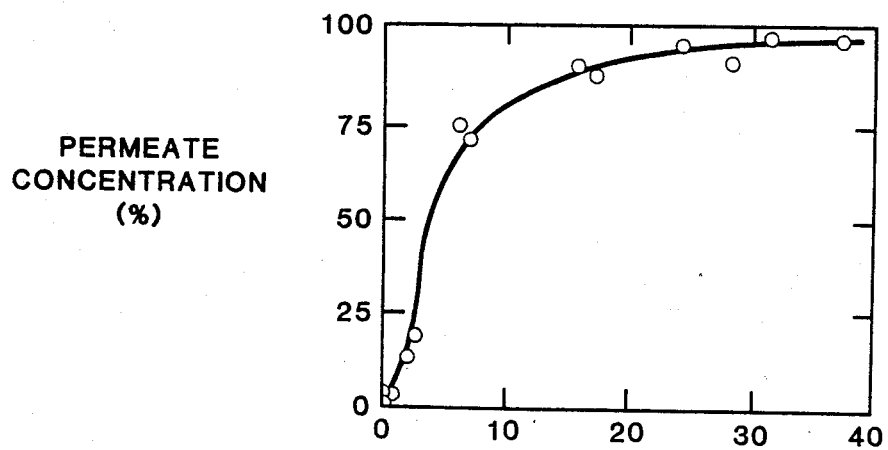
FIG. 7 is a graph showing the relationship between feed and permeate concentrations of CFC-11 at CFC feed concentrations up to about 35 vol %.
Figure 8:
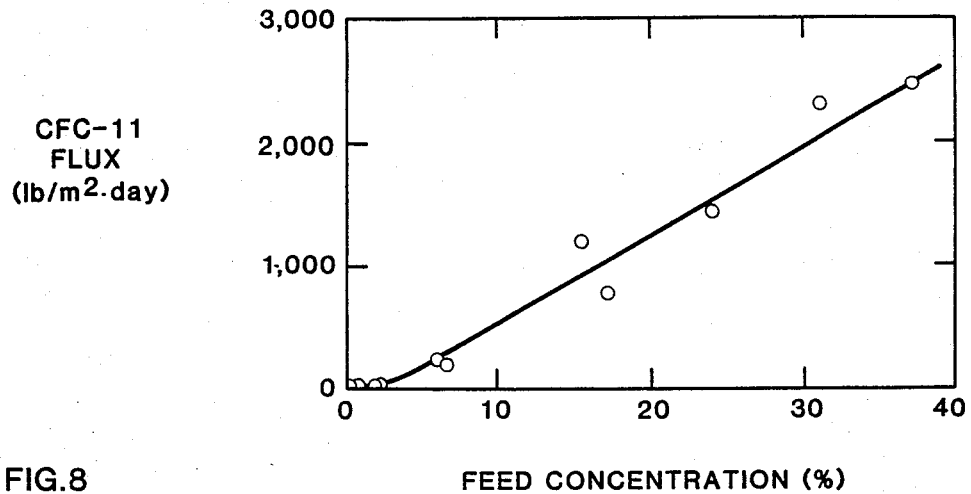
FIG. 8 is a graph showing the relationship between CFC flux and feed concentration of CFC-11 at CFC feed concentrations up to about 35 vol %.

The experimental procedures described were carried out using a feedstream containing CFC-11 ($CCl_3F$) in concentrations from 1–35 vol %. The results are summarized in FIGS. 7 and 8. The calculated CFC/$N_2$ selectivity of the module increased from 30 at 1 vol % to 50 at 35 vol %. This effect may be attributable to plasticization of the membrane material by sorbed hydrocarbon. Both hydrocarbon and nitrogen fluxes increased with increasing hydrocarbon feed concentration.

EXAMPLE 3.

CFC-113. Low concentrations.

Figure 9:
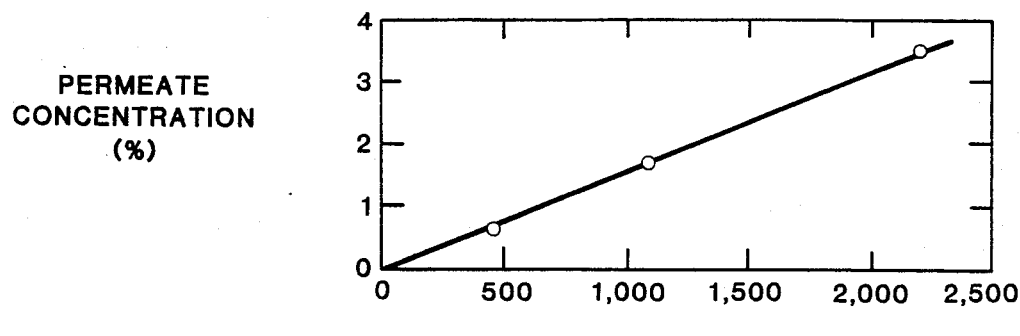
FIG. 9 is a graph showing the relationship between feed and permeate concentrations of CFC-113 at low CFC feed concentrations.

The experimental procedures described were carried out using a feedstream containing CFC-113 ($C_2Cl_3F_3$) in concentrations from 500–2,000 ppm. The results are summarized in FIG. 9. The calculated CFC/$N_2$ selectivity of the module remained constant at about 20 over the feed concentration range.

EXAMPLE 4.

CFC-113. Higher concentrations.

Figure 10:
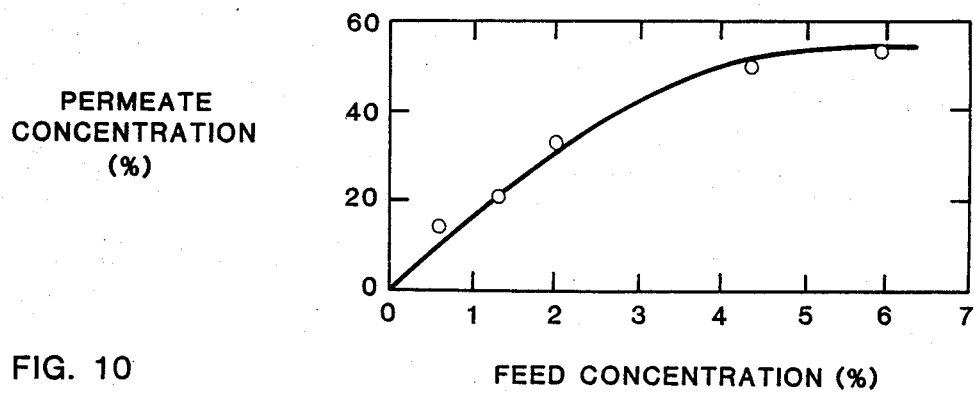
FIG. 10 is a graph showing the relationship between feed and permeate concentrations of CFC-113 at CFC feed concentrations up to about 6 vol %.

The experimental procedures described were carried out using a feedstream containing CFC-113 ($C_2Cl_3F_3$) in concentrations from 0.5–6 vol %. The results are summarized in FIG. 10. The calculated CFC/$N_2$ selectivity of the module remained constant at about 25 over the feed concentration range.

EXAMPLE 5.

HCFC-123. Low concentrations.

Figure 11:
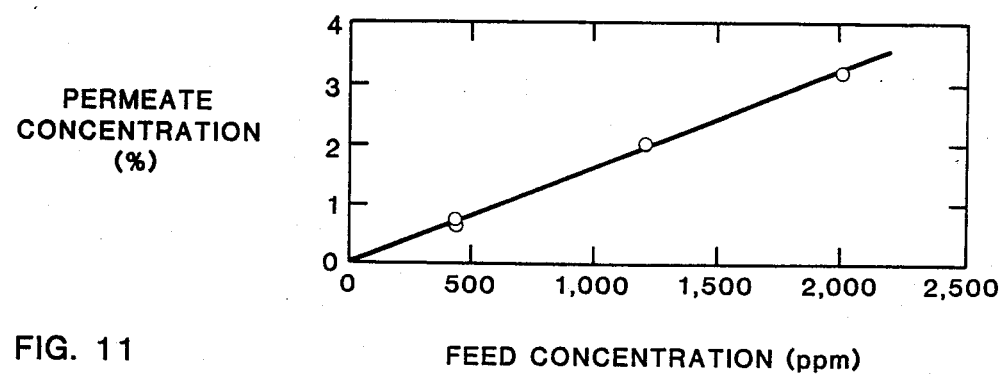
FIG. 11 is a graph showing the relationship between feed and permeate concentrations of HCFC-123 at low CFC feed concentrations.

The experimental procedures described were carried out using a feedstream containing HCFC-123 ($C_2HCl_2F_3$) in concentrations from 500–2,000 ppm. The results are summarized in FIG. 11. The calculated CFC/$N_2$ selectivity of the module remained constant at about 25 over the feed concentration range.

EXAMPLE 6.

HCFC-123. Higher concentrations.

Figure 12:
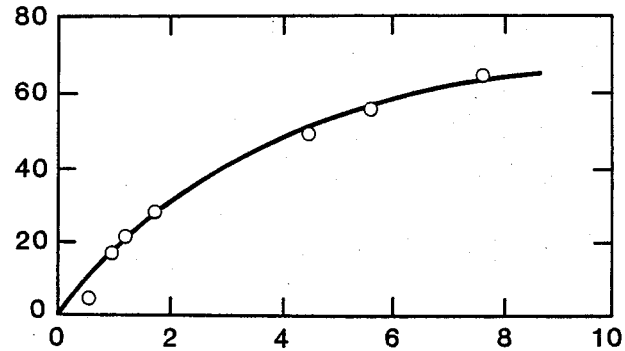
FIG. 12 is a graph showing the relationship between feed and permeate concentrations of HCFC-123 at CFC feed concentrations up to about 8 vol %.

The experimental procedures described were carried out using a feedstream containing HCFC-123 ($C_2HCl_2F_3$) in concentrations from 0.5–8 vol %. The results are summarized in FIG. 12. The calculated CFC/$N_2$ selectivity of the module remained constant at about 25 over the feed concentration range.

EXAMPLE 7.

HCFC-142b.

Figure 13:
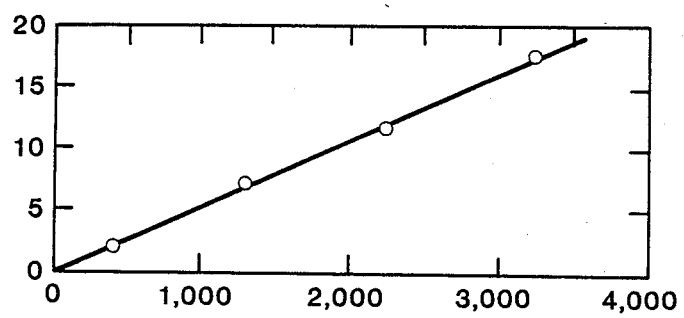
FIG. 13 is a graph showing the relationship between feed and permeate concentrations of HCFC-142b at low CFC feed concentrations.

The experimental procedures described were carried out using a feedstream containing HCFC-142b ($C_2H_3ClF_2$) in concentrations from 300–3,500 ppm. The results are summarized in FIG. 13. The calculated CFC/$N_2$ selectivity of the module increased very slightly from 13 to 15 over the feed concentration range.

EXAMPLE 8.

CFC-114.

Figure 14:
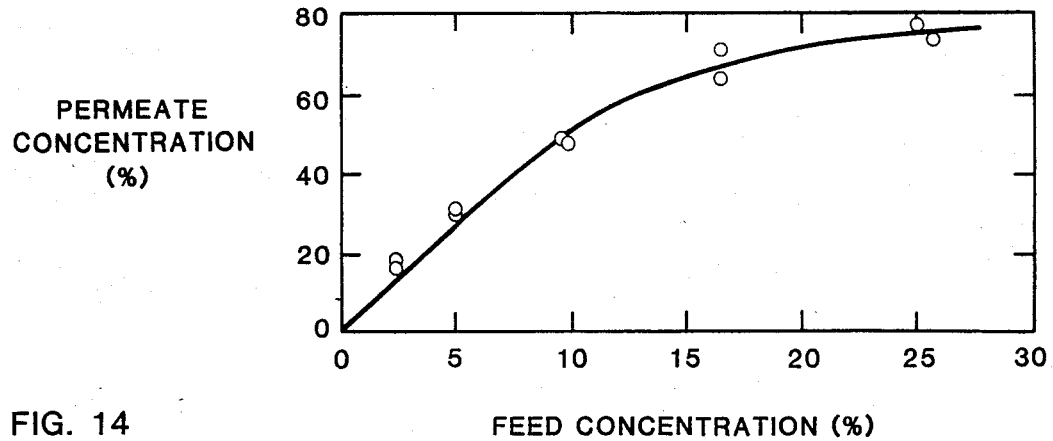
FIG. 14 is a graph showing the relationship between feed and permeate concentrations of CFC-114 at CFC feed concentrations up to about 25 vol %.

The experimental procedures described were carried out using a feedstream containing CFC-114 ($C_2Cl_2F_4$) in concentrations from 2–25 vol %. The results are summarized in FIG. 14. The calculated CFC/$N_2$ selectivity of the module increased very slightly from about 9 to 12 over the feed concentration range.

EXAMPLE 9.

Halon-1301.

The experimental procedures described were carried out using a feedstream containing Halon-1301 ($CF_3Br$) in concentrations from 0.1–5 vol %. A Halon/nitrogen selectivity of about 4 was obtained.

EXAMPLE 10.

Figure 15:
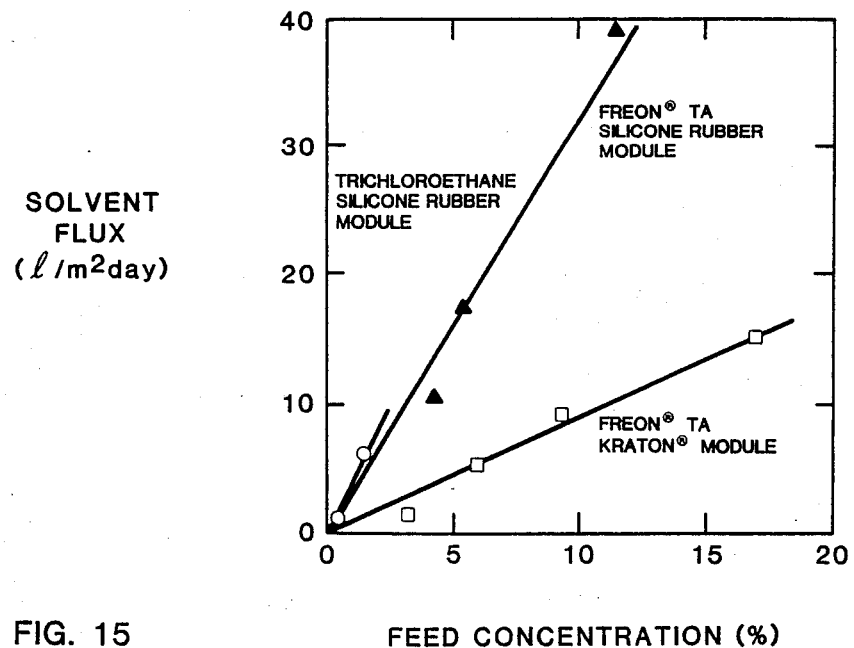
FIG. 15 is a graph showing the relationship between solvent flux and feed concentration of Freon® TA using silicone rubber or polystyrene-butadiene copolymer membranes.
Figure 16:
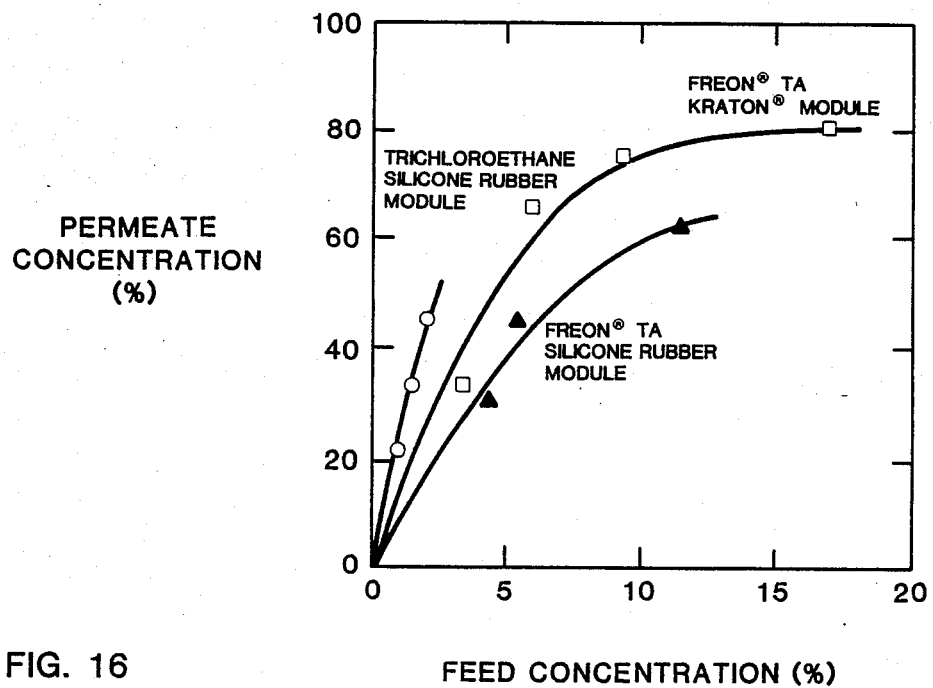
FIG. 16 is a graph showing the relationship between feed and permeate concentrations of Freon® TA using silicone rubber or polystyrene-butadiene copolymer membranes.

Freon® TA The experimental procedures described were carried out using a feedstream containing Freon® TA (89% $C_2Cl_3F_3$, 11% acetone) in concentrations from 4–17 vol %. The experiment was repeated using a module with a polystyrene-butadiene copolymer permselective layer. The results for both modules are summarized in FIGS. 15 and 16. The module with the polystyrene-butadiene copolymer permselective layer was more selective for the organic component over air, but the solvent flux was considerably lower.

Examples 11–12.

Economic analyses

The capital and operating costs of a fluorinated hydrocarbon recovery system are the principal factors that determine whether the systems will be used industrially. In the following analyses, it is assumed that the streams to be treated are available at ambient pressure and that the driving force for permeation is created by lowering the permeate pressure, i.e., the system operates in a mixed pressure vacuum mode. The cost calculations presented here are all based on a halocarbon-over-nitrogen membrane selectivity equal to 25. This value is representative for CFC-113 and HCFC-123 and is lower than the value determined for CFC-11. The calculations were performed using a computer program based on the gas permeation equations for cross flow conditions described by Shindo et al., "Calculation Methods for Multicomponent Gas Separation by Permeation," *Sep. Sci. Technol.* 20, 445–459 (1985).

The cost assumptions used are listed in Table 4. A total system life of 10 years is assumed except for the membrane modules which are assumed to have a life of three years.

TABLE 4

Cost Parameters Used in Economic Analysis

CAPITAL COST ITEMS:

| | | |
|---|---|---|
| 1. | Membrane Module Cost: | $200/$m^2$ |
| 2. | Vacuum Pump Cost: | $48/per actual cfm displacement[1] |
| 3. | Compressor Cost: | $1,00/hp[1] |
| 4. | System Costs includes piping, instrumentation, condensers, frame, etc. (estimated to be equal to the sum of the vacuum pump and compressor costs). | |

TABLE 4-continued
Cost Parameters Used in Economic Analysis

Capital Costs = Membrane module cost + vacuum pump cost + compressor cost + system costs.

OPERATING COST ITEMS:

1. Fixed Costs:
   | | |
   |---|---|
   | Depreciation & interest | 17% of capital costs excluding membranes |
   | Maintenance, labor and materials | 5% of capital costs excluding membranes |
   | Taxes, insurance and administration | 4% of capital costs excluding membranes |
   | Total: | 26% of capital costs excluding membranes |

2. Membrane Module Replacement Cost: 40% of membrane module capital costs

3. Energy Costs (based on 300 days, 24 h/day, $0.05/kWh): $360/kW · year; $265/hp · year Operating Costs = fixed costs + membrane module replacement cost + energy costs

[1] Based on 1988 vendor's price list, plus 20%.

EXAMPLE 11.
95% CFC removal.

The cost assumptions above were applied to a two-stage membrane system similar to that shown in FIG. 3, designed to remove 95% of CFC-113 from a 1,000 scfm air stream containing 0.5% CFC. The airstream is first compressed to 15 psig and passes through the first membrane stage. The residue stream contains 250 ppm CFC-113 and the produced permeate stream contains 2.3% CFC-113. This permeate stream is then passed to the second membrane stage where the CFC content is reduced to 0.5%. The residue stream from the second stage is then recirculated to the inlet of the first membrane stage. The permeate stream produced by the second stage contains 11.2% CFC-113 and is compressed to 100 psig prior to entering a condenser operating at 5° C. Most of the CFC-113 vapor is condensed and the condenser bleed stream is returned to the inlet of the second membrane stage. The function of the second stage is thus to further concentrate the CFC-113 to make condensation feasible. The second stage is one-fifth of the size of the first stage and represents about 20% of the system's capital and operating costs. Table 5 summarizes the capital and operating costs.

TABLE 5
Capital and operating costs of a membrane system to recover 95% of CFC-113 from a CFC laden airstream

| | FEED | PERMEATE | RESIDUE |
|---|---|---|---|
| Flow (scfm) | 1,000 | 140 lb/h liquid | 995 |
| Concentration (%) | 0.5 | | 250 ppm |
| Membrane Selectivity | 25 | | |
| Membrane Area | 1,270 m² | | |
| Vacuum Pumps | 248 hp | | |
| Compressors | 155 hp | | |
| CAPITAL COST | | $680,00 $680/scfm feed | |
| OPERATING COSTS | | | |
| Depreciation + interest | | $116,000 | |
| Module replacement (3-year lifetime) | | $100,000 | |
| Energy | | $100,000 | |
| OPERATING COST | | $316,000/year $0.73/1,000 scf feed | |
| | | $0.3/lb solvent recovered | |

Capital cost is estimated to be $680,000 or $600/scfm feed. Operating cost is $316,000 per year or $0.3/lb CFC-113 recovered. CFC-113 currently costs about $1–1.50/lb, HCFC-123 costs up to $7/lb, and CFC-11 costs up to $1/lb, so recovery by this type of membrane process is extremely attractive.

EXAMPLE 12.
99% CFC removal.

A second system designed to treat the same 1,000 scfm stream of 0.5% CFC-113 was evaluated. In this system the fractional removal of CFC-113 from the stream was increased from 95 to 99%. This system is a two-step-two-stage system, combining the system designs shown in FIGS. 3 and 4, so that both the permeate and residue streams from the first membrane unit are passed to second units. The two-step first stage, as in FIG. 4, produces two permeate streams. One stream contains 3.1% CFC-113 and becomes the feed stream for the second stage. The second permeate stream contains 0.4% CFC-111 and is recirculated to the feed of the first stage. A two-step, two-stage configuration is more economical than a simple two-stage configuration in applications where high solvent recoveries are required. Table 6 summarizes the capital and operating costs.

TABLE 6
Capital and operating costs of a membrane system to recover 95% of CFC-113 from a CFC laden airstream

| | FEED | PERMEATE | RESIDUE |
|---|---|---|---|
| Flow (scfm) | 1,000 | 140 lb/h Liquid | 995 |
| Concentration (%) | 0.5 | | 50 ppm |
| Membrane Selectivity | | 25 | |
| Membrane Area | | 1,870 m² | |
| Vacuum Pumps | | 326 hp | |
| Compressors | | 227 hp | |
| CAPITAL COSTS | | $956,000 $956/scfm feed | |
| OPERATING COSTS | | | |
| Depreciation + interest | | $156,000 | |
| Module replacement (3-year lifetime) | | $150,000 | |
| Energy | | $140,000 | |
| | | $446,000 | |
| OPERATING COST | | $1.5/1,000 scf feed $0.4/lb solvent recovered | |

The estimated capital cost of the system is $956,000 or $956/scfm feed. Operating cost is $446,000 per year or $0.4/lb CFC-113 recovered.

Comparing Examples 11 and 12, recovering 99% of the CFC-113 is about 1.4 times more expensive than recovering 95% of the CFC-113.

EXAMPLE 13.
80% CFC Removal.

A system designed to treat a 500 scfm stream of 300 ppm CFC-11 was evaluated, using the computer models and assumptions described above. In this case, a membrane selectivity of 30 was assumed, based on experimental results. The system is a single-stage system like that shown in FIG. 2. The airstream is compressed to 15 psig and passes through the membrane unit. The residue stream contains 70 ppm CFC-11. The permeate stream contains 1,700 ppm CFC-11. Table 7 summarizes the capital and operating costs.

TABLE 7

Capital and operating costs of a membrane system to recover 80% of CFC-11 from a CFC laden airstream

|  | FEED | PERMEATE | RESIDUE |
|---|---|---|---|
| Flow (scfm) | 500 | 70 | 430 |
| Concentration (ppm) | 300 | 1,700 | 70 |
| Membrane Selectivity |  | 30 |  |
| Membrane Area |  | 233 m² |  |
| Vacuum Pumps |  | 49 hp |  |
| Compressors |  | 37 hp |  |
| CAPITAL COSTS |  | $282,000 |  |
|  |  | $560/scfm feed |  |
| OPERATING COSTS |  |  |  |
| Depreciation + interest |  | $43,600 |  |
| Module replacement (3-year lifetime) |  | $46,600 |  |
| Energy |  | $22,800 |  |
|  |  | $113,000 |  |
| OPERATING COST |  | 0.52/1,000 scf feed |  |
|  |  | $0.68/lb solvent recovered |  |

EXAMPLES 14 and 15.

Prediction of Performance of other Fluorinated Hydrocarbons.

The experimental fluorinated hydrocarbon selectivity data can be used to obtain a correlation between the molecular structure of the fluorinated hydrocarbon and its membrane transport properties, which can be used to predict the performance of other fluorinated hydrocarbons. The permeability of a vapor through a membrane is a product of the diffusion coefficient, D, and the Henry's law sorption coefficient, k. D is a measure of the permeant's mobility in the polymer; k is a measure of the permeant's sorption into the polymer. For simple permeants, such as the smaller fluorinated hydrocarbons, the diffusion coefficient tends to decrease with increasing permeant diameter because large molecules interact with more segments of the polymer chains and are thus less mobile. Thus, the diffusion coefficient, and hence permeability, will decrease as hydrogen atoms are replaced by halogen atoms. This effect should be greatest when bromine is substituted for hydrogen, followed by chlorine and fluorine in order of decreasing atomic size. On the other hand, substituting a halogen atom for a hydrogen atom also changes the condensability of the molecules as measured by the boiling point. The sorption coefficient of gases increases with the condensability of the gas because this is a measure of the energy required for the gases to be sorbed by the polymer.

EXAMPLE 14.

Fluorinated hydrocarbons with one carbon atom.

Figure 17:
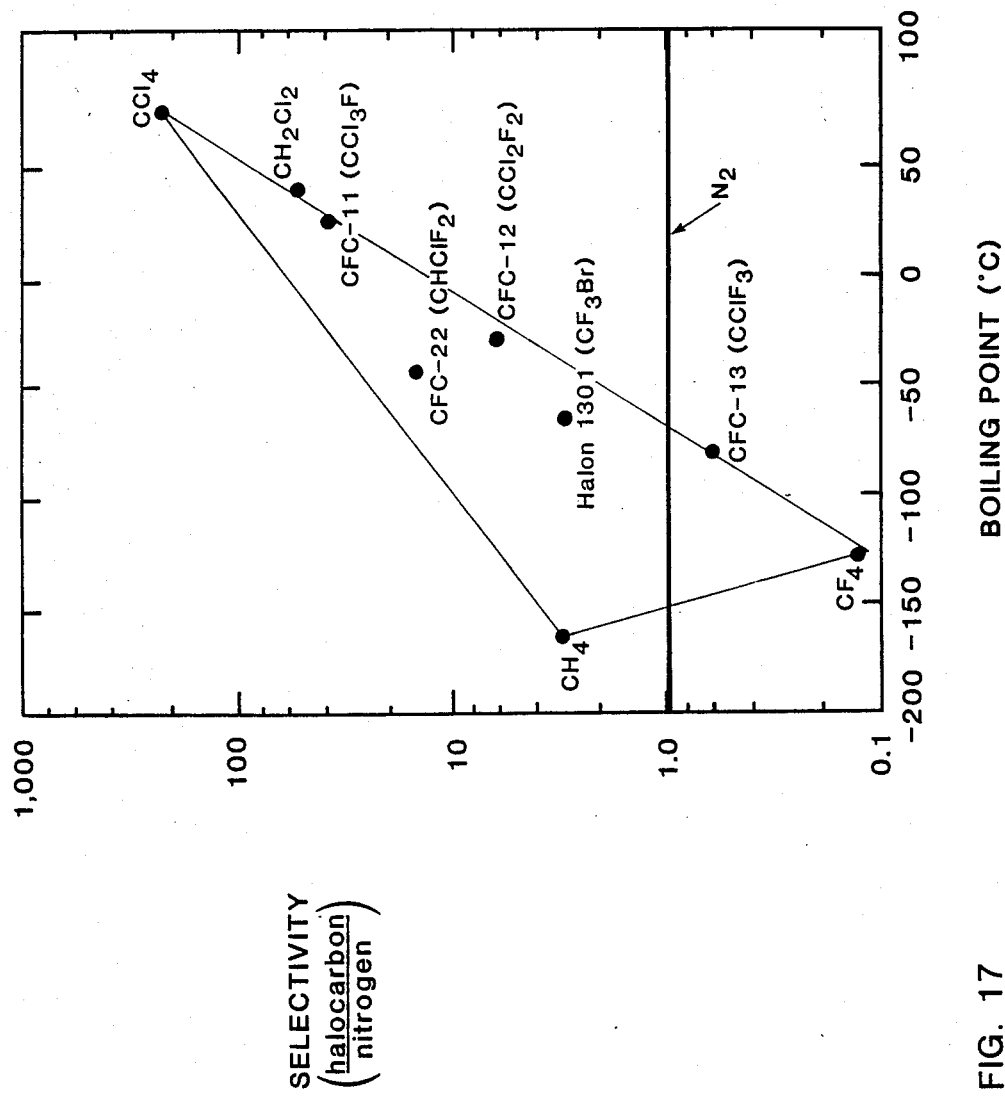
FIG. 17 is a plot of experimentally determined fluorinated hydrocarbon/nitrogen selectivity against boiling point for a selection of compounds having one carbon atom.

FIG. 17 plots the experimentally determined fluorinated hydrocarbon/nitrogen selectivity against boiling point for a selection of compounds having one carbon atom. All of the data points lie within a triangle whose apices are $CH_4$, $CF_4$ and $CCl_4$. There is a clear trend for membrane permeability to increase as the boiling point increases and the permeant becomes more condensable. However, for molecules of similar boiling point (condensability) molecular size becomes important. Thus, $CH_4$ is significantly more permeable than $CF_4$, although their condensabilities are similar. Similarly, substitution of hydrogen for chlorine in CFC-22 ($CHClF_2$) and CFC-12 ($CCl_2F_2$) does not change the condensability of the compounds significantly, but decreases permeability by five-fold because of the change in molecular size.

EXAMPLE 15.

Fluorinated hydrocarbons with two carbon atoms.

Figure 18:
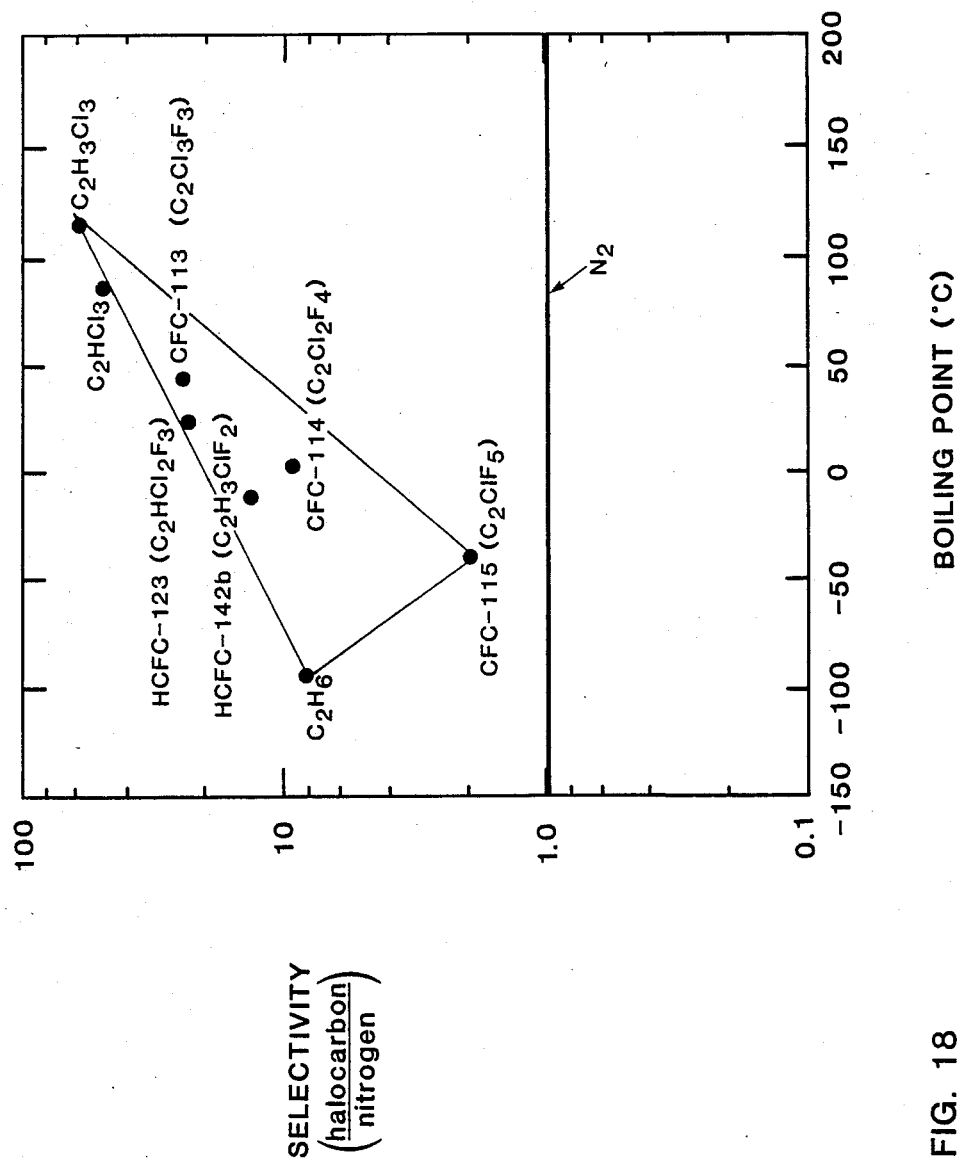
FIG. 18 is a plot of the fluorinated hydrocarbon/nitrogen selectivity against boiling point for a selection of compounds having two carbon atoms.

FIG. 18 plots the fluorinated hydrocarbon/nitrogen selectivity against boiling point for a selection of compounds having two carbon atoms. The data for the two-carbon molecules is less complete than that for the single carbon atom compounds, but the same general behavior can be observed.

We claim:

1. A process for treating fluorinated hydrocarbon-laden gas streams, comprising:
   providing a first membrane having a feed side and a permeate side;
   contacting said feed side with a feedstream comprising a fluorinated hydrocarbon component;
   withdrawing from said permeate side a permeate stream enriched in said fluorinated hydrocarbon component;
   withdrawing from said feed side a residue stream depleted in said fluorinated hydrocarbon component;

2. The process of claim 1, wherein said membrane is a composite membrane comprising a microporous support layer and a thin permselective coating layer.

3. The process of claim 1, wherein said membrane comprises a rubbery polymer.

4. The process of claim 1, wherein said membrane comprises silicone rubber.

5. The process of claim 1, wherein said membrane comprises a polystyrenebutadiene copolymer.

6. The process of claim 1, wherein said membrane has a fluorinated hydrocarbon/nitrogen selectivity not less than 5.

7. The process of claim 1, wherein said membrane has a fluorinated hydrocarbon/nitrogen selectivity not less than 10.

8. The process of claim 1, wherein a fluorinated hydrocarbon flux through the membrane is induced by creating a partial vacuum on the permeate side of the membrane.

9. The process of claim 1, wherein said fluorinated hydrocarbon comprises a CFC.

10. The process of claim 1, wherein said fluorinated hydrocarbon comprises an HCFC.

11. The process of claim 1, wherein at least a five-fold enrichment of said fluorinated hydrocarbon in said permeate stream compared with said feedstream is obtained.

12. The process of claim 1, wherein at least a ten-fold enrichment of said fluorinated hydrocarbon in said permeate stream compared with said feedstream is obtained.

13. The process of claim 1, wherein at least 80% of said fluorinated hydrocarbon component is removed from said feedstream.

14. The process of claim 1, wherein the partial vapor pressure of said fluorinated hydrocarbon component in said permeate stream is greater than the saturated vapor pressure of said fluorinated hydrocarbon component at 0° C.

15. The process claim 1, further comprising:
providing a second membrane having a feed side and a permeate side;
contacting said feed side of said second membrane with te permeate stream from said first membrane;
withdrawing from said permeate side of said second membrane a second permeate stream enriched in said fluorinated hydrocarbon component compared with said first permeate stream;
withdrawing from said feed side of said second membrane a second reside stream depleted in said fluorinated hydrocarbon component compared with said first permeate stream.

16. The process of claim 1, further comprising:
providing a second membrane having a feed side and a permeate side;
contacting said feed side of said second membrane with the residue stream from said first membrane;
withdrawing from said permeate side of said second membrane a second permeate stream enriched in said fluorinated hydrocarbon component compared with said residue stream;
withdrawing from said feed side of said second membrane a second residue stream depleted in said fluorinated hydrocarbon component compared with said first residue stream.

17. The process of claim 1, wherein said feedstream is at a feed pressure and said permeate stream is at a permeate pressure characterized in that the ratio of said permeate pressure to said feed pressure is in the range 0.01 to 0.1.

18. The process of claim 1, wherein said feedstream comprises an organic compound containing one atom of carbon and one atom of fluorine.

19. The process of claim 1, wherein said feedstream comprises an organic compound containing one atom of carbon, one atom of fluorine and one atom of hydrogen.

20. The process of claim 1, wherein said feedstream comprises an organic compound containing one atom of carbon, one atom of fluorine and one atom of chlorine.

21. The process of claim 1, wherein said feedstream comprises an organic compound containing one atom of carbon, one atom of fluorine and one atom of bromine.

22. The process of claim 1, wherein said feedstream comprises CFC-11.

23. The process of claim 1, wherein said feedstream comprises CFC-12.

* * * * *